US008308219B2

(12) United States Patent  
Willard

(10) Patent No.: US 8,308,219 B2  
(45) Date of Patent: Nov. 13, 2012

(54) Z-FOLD CONVERTIBLE TOP WITH PRESSURIZED REAR BOW

(75) Inventor: Michael T. Willard, Harrison Township, MI (US)

(73) Assignee: Magna Car Top Systems GmbH, Rochester Hills, MI (US)

(*) Notice: Subject to any disclaimer, the term of this patent is extended or adjusted under 35 U.S.C. 154(b) by 161 days.

(21) Appl. No.: 12/693,528

(22) Filed: Jan. 26, 2010

(65) Prior Publication Data

US 2010/0187854 A1 Jul. 29, 2010

Related U.S. Application Data

(60) Provisional application No. 61/147,210, filed on Jan. 26, 2009.

(51) Int. Cl.  
*B60J 7/12* (2006.01)  
*B60J 7/08* (2006.01)

(52) U.S. Cl. ............... 296/107.12; 296/107.09; 296/117; 296/118

(58) Field of Classification Search ............. 296/107.01, 296/107.07, 107.08, 107.09, 107.12, 108, 296/109, 112, 116, 117, 118, 121, 122  
See application file for complete search history.

(56) References Cited

U.S. PATENT DOCUMENTS

| 5,620,226 | A | 4/1997 | Sautter, Jr. | |
|---|---|---|---|---|
| 6,048,021 | A | 4/2000 | Sautter, Jr. | |
| 6,416,111 | B1 | 7/2002 | Neubrand | |
| 6,464,284 | B2 | 10/2002 | Neubrand | |
| 6,629,719 | B2 * | 10/2003 | Sims | 296/109 |
| 6,966,599 | B2 | 11/2005 | Willard | |
| 7,334,831 | B2 | 2/2008 | Wezyk et al. | |
| 8,002,326 | B2 * | 8/2011 | Neubrand | 296/107.07 |
| 8,025,328 | B2 * | 9/2011 | Dilluvio et al. | 296/109 |
| 2002/0084673 | A1 | 7/2002 | Neubrand | |
| 2004/0046415 | A1 | 3/2004 | Heselhaus | |
| 2004/0262942 | A1 | 12/2004 | Willard | |
| 2007/0170750 | A1 * | 7/2007 | Just et al. | 296/121 |
| 2009/0085369 | A1 * | 4/2009 | Willard et al. | 296/107.01 |

* cited by examiner

*Primary Examiner* — Dennis Pedder  
*Assistant Examiner* — Jason S Daniels  
(74) *Attorney, Agent, or Firm* — Brooks Kushman P.C.

(57) ABSTRACT

A convertible top and method of operating the convertible top is disclosed. The top has a power cylinder that is mounted to the top stack linkage that lifts the one bow from the windshield header on a four bar link and also simultaneously releases the pressure applied by a pressure link to the rear bow. The pressure link includes an upper link and a lower link that are locked together in an over-center relationship when the top is extended to eliminate vibration of the rear bow or lifting the rear bow off of the rear deck.

7 Claims, 5 Drawing Sheets

Z-FOLD CONVERTIBLE TOP WITH PRESSURIZED REAR BOW

CROSS-REFERENCE TO RELATED APPLICATIONS

This application claims the benefit of U.S. provisional application Ser. No. 61/147,210 filed Jan. 26, 2009.

BACKGROUND OF THE INVENTION

1. Field of the Invention

The present invention relates to a convertible top of the Z-fold type in which a front section of the top is folded over an intermediate section of the top and both are folded over a back section of the top.

2. Background Art

Convertible tops for vehicles generally feature a cover that is supported on a top stack linkage that includes a plurality of bows that extend laterally across the vehicle. The rearmost bow of a convertible top is generally referred to as the five bow, or rear bow. The rear bow engages the top of the rear deck of the vehicle when the top is extended.

One problem with prior art convertible tops is that, at high speeds, the rear bow may lift or vibrate when the convertible top is in its extended position covering the passenger compartment of the vehicle. Wind entering the vehicle through the windows or passing over the convertible top, may cause the rear bow to lift or vibrate. Both conditions are undesirable. If the rear bow lifts off of the rear deck, it may be perceived as a problem with the convertible top. Vibration of the rear bow may cause undesirable noise.

There is a need for a lightweight, simple and effective convertible top stack mechanism that prevents the rear bow from lifting or vibrating at high speeds without adding substantial additional cost to the convertible top assembly. There is also a need for a convertible top that may be extended or retracted while the vehicle is moving at a reduced speed.

These and other problems and needs are addressed by applicants' development as summarized below.

SUMMARY OF THE INVENTION

Applicant's invention is directed to the concept of providing a Z-fold style convertible top that applies pressure to the rear bow to urge the rear bow into engagement with the top of the rear deck of the vehicle. The pressure applied to the rear bow prevents the rear bow from lifting or vibrating even at high speeds.

Pressure is applied to the rear bow through a pressure link by a power cylinder that is connected to the top stack linkage. The cylinder applies pressure through a pressure link to the rear bow when the top is in its extended position. Retraction of the top is initiated by lifting the header, or one bow, with a four bar link while releasing the pressure link that applies pressure to the rear bow. The four bar linkage and pressure link are pivotally connected to the power cylinder at a single pivot point.

A main cylinder may be provided to actuate the other parts of the top stack linkage by acting upon the rear rail or balance link of the convertible top. The main cylinder moves the top into and out of a storage compartment.

The size of the storage compartment is minimized by stowing the one bow horizontally over the engine as a result of the Z-fold construction. A rigid tonneau panel may be provided to cover the top in its stored position.

These and other features and advantages will be apparent from the attached drawings in view of the following detailed description of the illustrated embodiment.

DETAILED DESCRIPTION OF THE PREFERRED EMBODIMENT(S)

Figure 1:
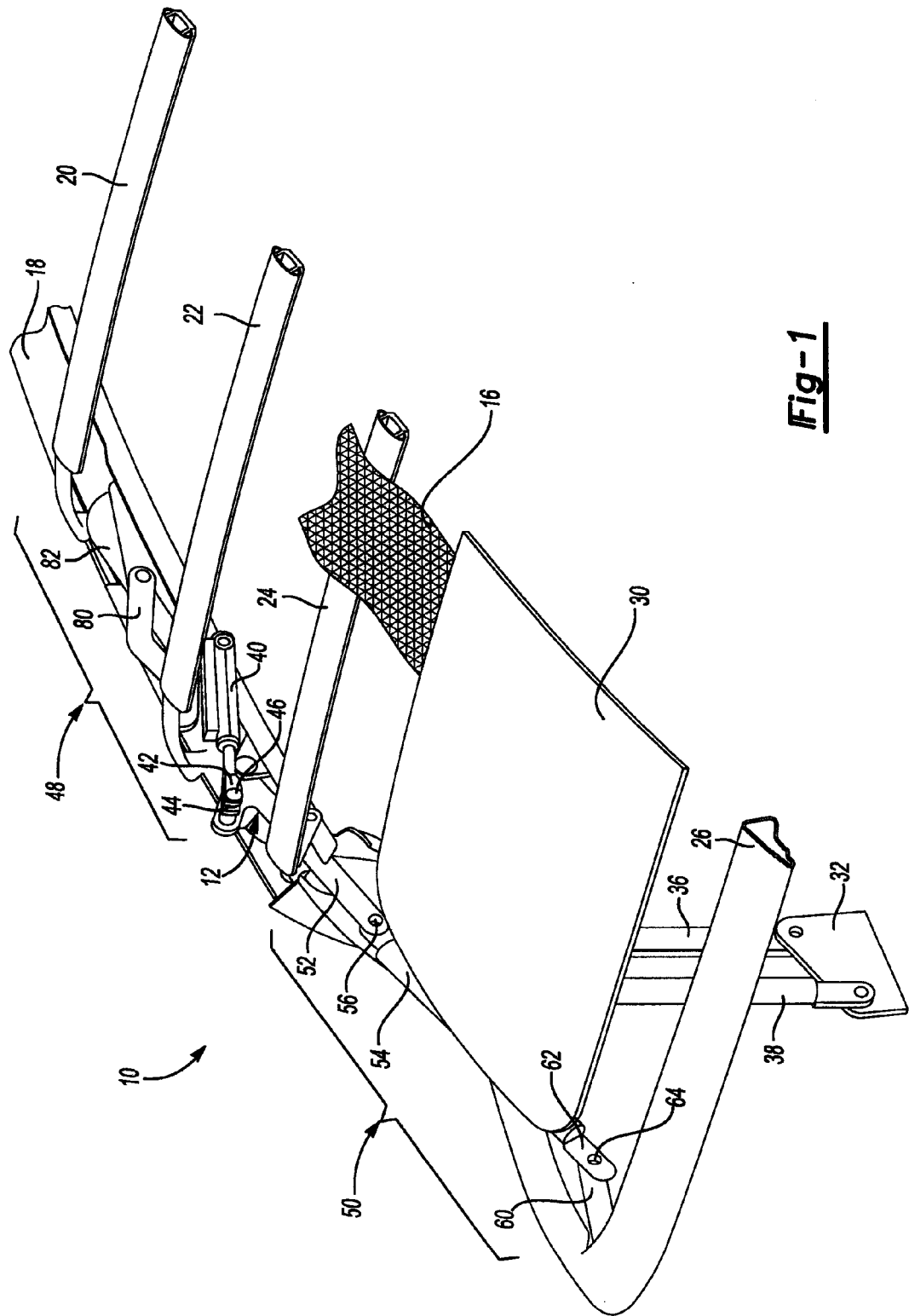
FIG. 1 is a fragmentary rear perspective view of one side of a Z-fold convertible top made in accordance with one embodiment of the present invention.

Referring to FIG. 1, a Z-fold convertible top 10 is shown in part with only the left side of the top being illustrated. It should be understood that the right side of the top is a substantially mirror image of the left side of the top, but is not shown to avoid repetition. The convertible top 10 includes a top stack linkage 12 that includes a plurality of articulated links used to extend and retract the convertible top 10.

A cover 16 is partially shown that is supported by a one bow 18, a two bow 20, a three bow 22, a four bow 24 and a five bow 26. The bows are numbered 1 through 5 in order from front to rear as they arranged when the convertible top 10 is in its extended, or covering, position. The number of bows may vary depending upon the size and design of the top 10 and references to the rear bow 26 should be understood to refer to the rearmost bow regardless of the total number of bows. A backlight 30 is supported by the cover 16 between the four bow 24 and the rear bow 26.

The convertible top 10 is moved between its extended and retracted position and is pivoted on a main pivot bracket 32. A rear rail 36 and a balance link 38 are pivotally secured to the main pivot bracket 32 and form part of the top stack linkage 12. The convertible top 10 is opened and closed by the top stack linkage 12 that is actuated by acting upon a four bar linkage 48 including the rear rail 36 and the balance link 38. The convertible top 10 may be opened and closed manually, however, a cylinder or motor drive 40 may be operatively connected to either the balance link 38 rear rail 36 or other part of the top stack linkage that is grounded to the vehicle to drive the rear rail 36 and balance link 38 as the top stack linkage 12 is moved between the extended position shown in FIG. 1 and the retracted position shown in FIG. 5, as will be described below.

A cylinder 40 is connected to the top stack linkage 12. The cylinder 40 may be a hydraulic or pneumatic cylinder that extends and retracts an extension rod 42. The extension rod 42 is connected by a clevis 44 and pin 46 to the top stack linkage 12. The top stack linkage 12 includes a front four bar linkage generally indicated by reference numeral 48 and a rear bow pressure linkage generally indicated by reference numeral 50. The cylinder 40 reciprocally drives the extension rod 42 to simultaneously lift the front four bar linkage 48 and release the pressure applied by the rear bow pressure link 50 when it is desired to move the top stack linkage 12 from the extended position shown in FIG. 1 toward the retracted position shown in FIG. 5. As used herein, the term "simultaneously" should be understood to mean generally at the same time as permitted by the mechanism described with reference to FIG. 4 below. The front four bar linkage 48 will be described below with reference to FIGS. 2-4.

The rear bow pressure link 50 includes an upper pressure link 52 that is connected to a lower pressure link 54 by an over-center joint pin 56. The lower, or rear end, of the lower pressure link 54 is connected to the rear bow 26 by a connector flange 60 that extends generally in a forward direction from the rear bow 26. A lower pressure link flange 62 formed on the lower pressure link 54 is connected by a pivot pin 64 to the connector flange 60.

Figure 2:
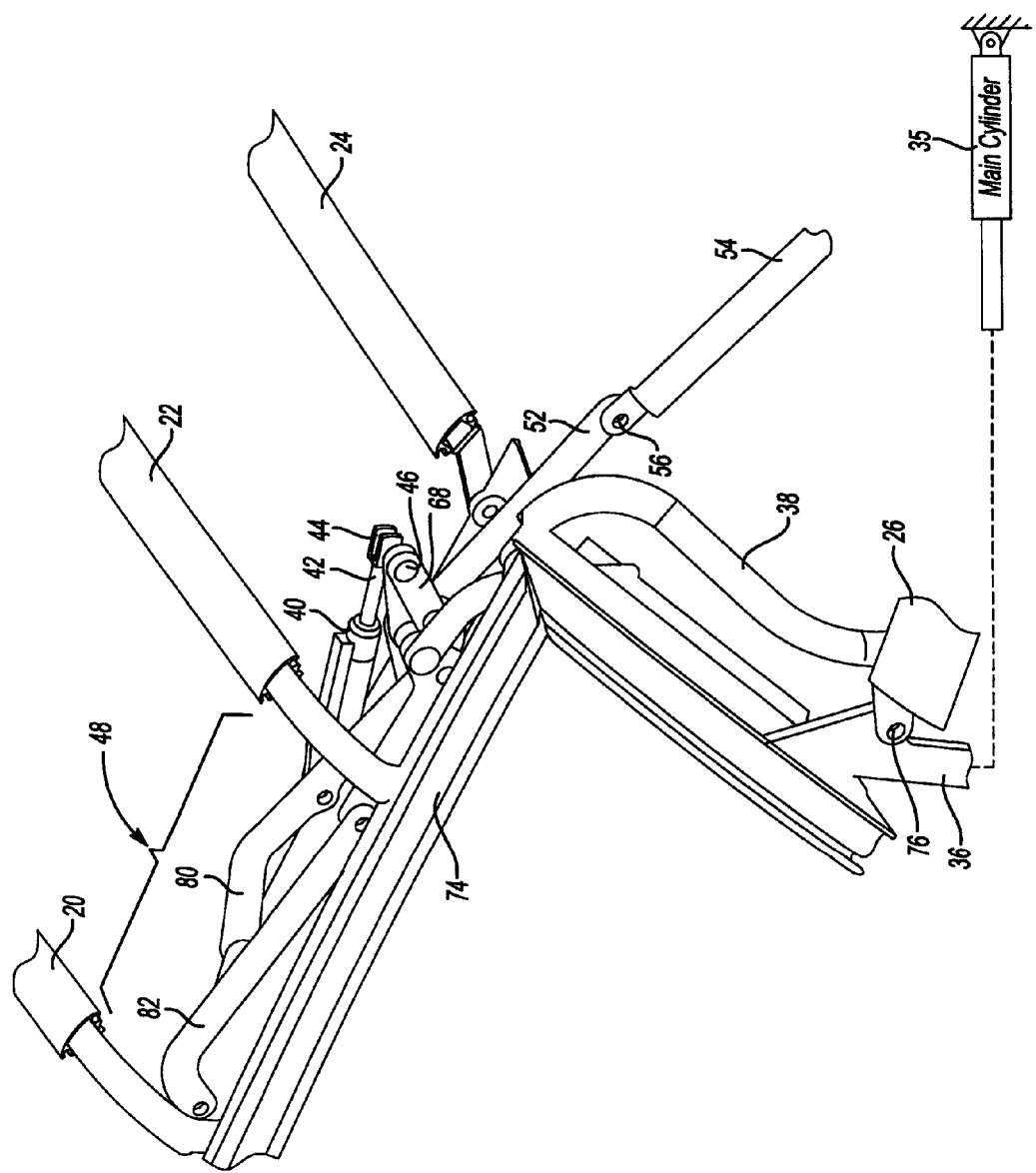
FIG. 2 is a fragmentary outside perspective view thereof.

Referring to FIG. 2, a portion of the top stack linkage 12 shown in FIG. 1 is shown from the outside. The one bow (not shown in FIG. 2) and two bow 20 are lifted by the front four bar linkage 48. Pressure is applied to the rear bow 26 by the rear bow pressure linkage 50 that includes the upper pressure link 52 and the lower pressure link 54 that are joined together by a joint pin 56. The upper and lower pressure links are preferably locked in place by pivoting the links 52 and 54 to an over-center relationship. While an over-center joint is preferred, the links could be arranged in a position other than an over-center condition, such as an aligned, locked position, that is equivalent to an over-center relationship.

The cylinder 40 extends the rod 42 to begin the retraction cycle for the top stack linkage 12. A top stack drive cylinder 40 acts on the balance link 38 and rear rail 36 after the cylinder 40 acts upon the pin 46 to release the pressure on the pressure linkage 50 and begins to lift the front four bar linkage 48. The pin 46 is also connected to a drag link 68 that extends from the pin 46 to a connection point with the front four bow linkage 48. The connection of the drag link 68 will be described more specifically with reference to FIG. 4 below.

Figure 3:
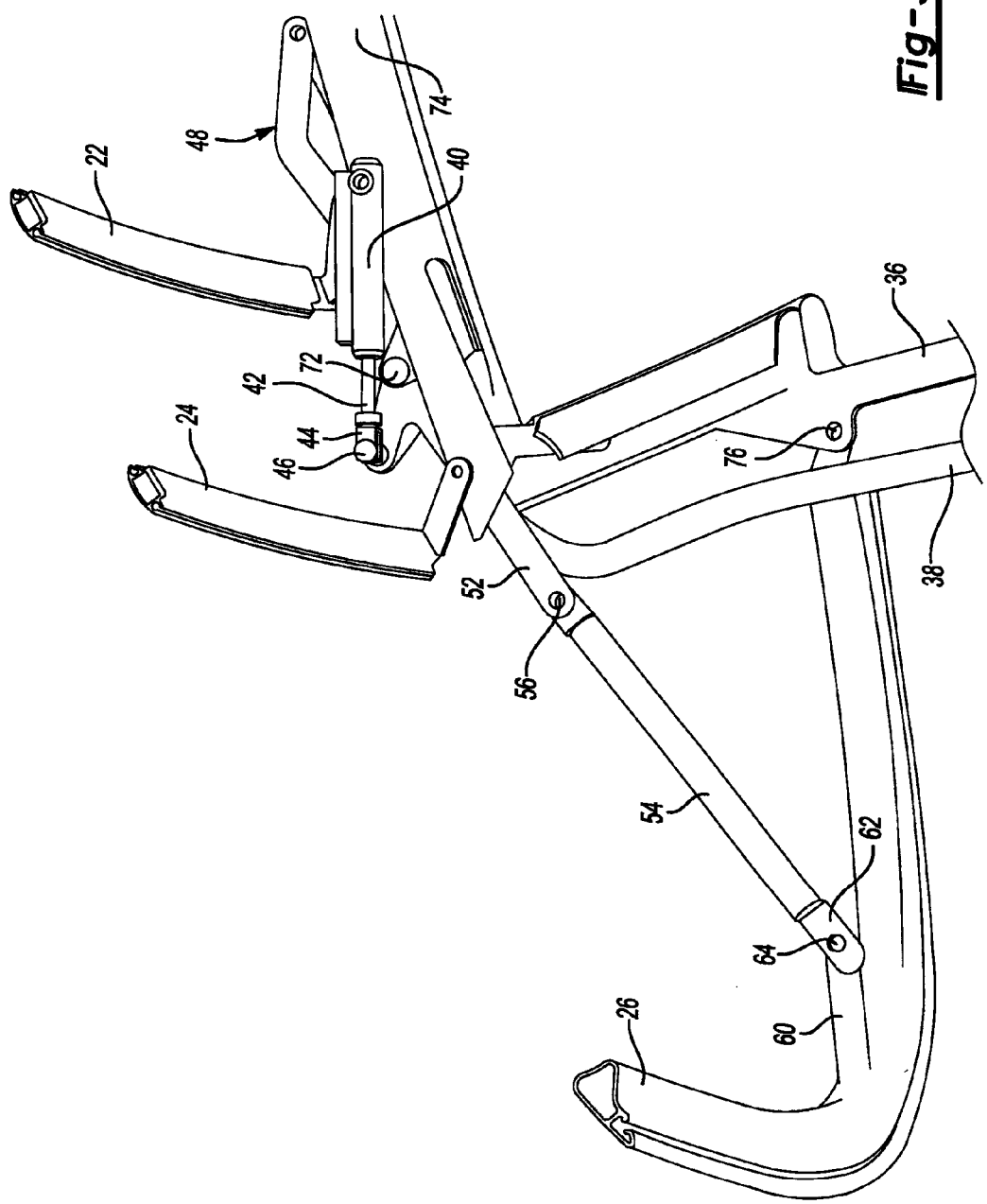
FIG. 3 is a fragmentary inside perspective view thereof.

FIGS. 2 and 3 also illustrate a center rail 74 that is hingedly connected to rear rail 36. The rear bow 26 is connected by a rear bow pivot pin 76 to the rear rail 36. The rear rail 36 and balance link 38 are operated by a power cylinder or motor 35 that controls operation of the top stack linkage 12 after the cylinder 40 has released the pressure on the rear bow pressure linkage 50 and also begins lifting the front four bar linkage 48 off of the windshield header of the vehicle (not shown). The load on the top stack drive cylinder 35 is reduced by the action of the cylinder 40 lifting the one bow 18 off of the windshield header. Referring more specifically to FIG. 2, a portion of the front four bar linkage 48 is shown to include a rear link 80 and a front link 82.

Figure 4:
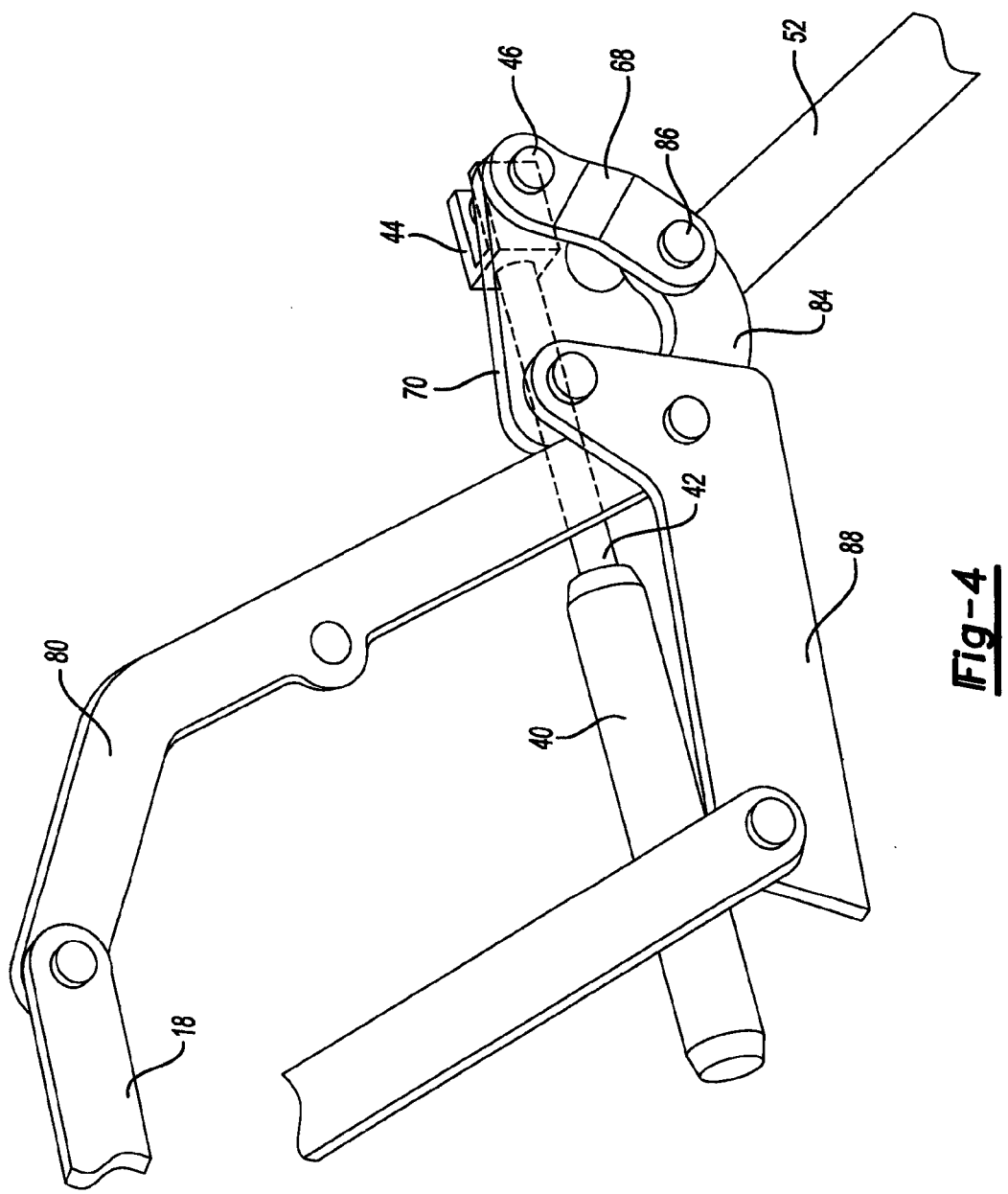
FIG. 4 is a fragmentary perspective view of the cylinder that drives the front four bar link and rear bow pressure link.

Referring to FIG. 4, the simultaneous actuation of the front four bar linkage 48 and the rear bow pressure linkage 50 in the initial stage of the top retraction by operation of the cylinder 40 is described below. The cylinder 40 extends the rod 42 which shifts the clevis 44 and pin 46 toward the right side, as shown in FIG. 4. The drag link 68 and pivot arm 70 of the upper pressure link 52 are driven by the pin 46. The pivot arm 70 is rotated in a clockwise direction as viewed in FIG. 4 to change the orientation of the upper pressure link 52 relative to the lower pressure link 54. If the joint pin 56 is locked in an over-center condition, the rotation of the upper pressure link 52 releases the over-center lock and allows the upper pressure link 52 and lower pressure link 54 to pivot in the downward direction which allows the rear bow 26 to be raised by the top stack linkage 12.

The drag link 68 is connected to the hook end 84 of the rear link 80 by a pin 86. Movement of the clevis 44 and pin 46 to the right in FIG. 4 causes the drag link 68 to act on the rear link 80 to pivot the rear link 80 in a clockwise direction as shown in FIG. 4. Raising the rear link 80 in this manner causes the entire front four bar linkage 48 to lift the one bow 18 off of the windshield header (not shown). The rear link 80 is connected on its upper end to the one bow 18 and is connected on its lower end to a lower link 88 of the front four bar linkage 48. The lower link 88 of the front four bar linkage 48 is connected at one end to the rear link 80 and on its opposite end to front link 82 of the front four bar linkage 48. The cylinder 40 assists the extension retraction of the convertible top by raising the one bow 18 and releasing the pressure or tension on the rear bow 26 simultaneously with a single stroke of the cylinder 40.

When it is desired to close the convertible top 10, the cylinder 40 operates at the end of the cycle of the main top stack linkage 12 by simply retracting the rod 42 into the cylinder 40. Retracting the rod 42 tensions the entire top by lowering the front four bar linkage 48 to the windshield header of the vehicle and also by locking the upper pressure link 52 to the lower pressure link 54.

Figure 5:
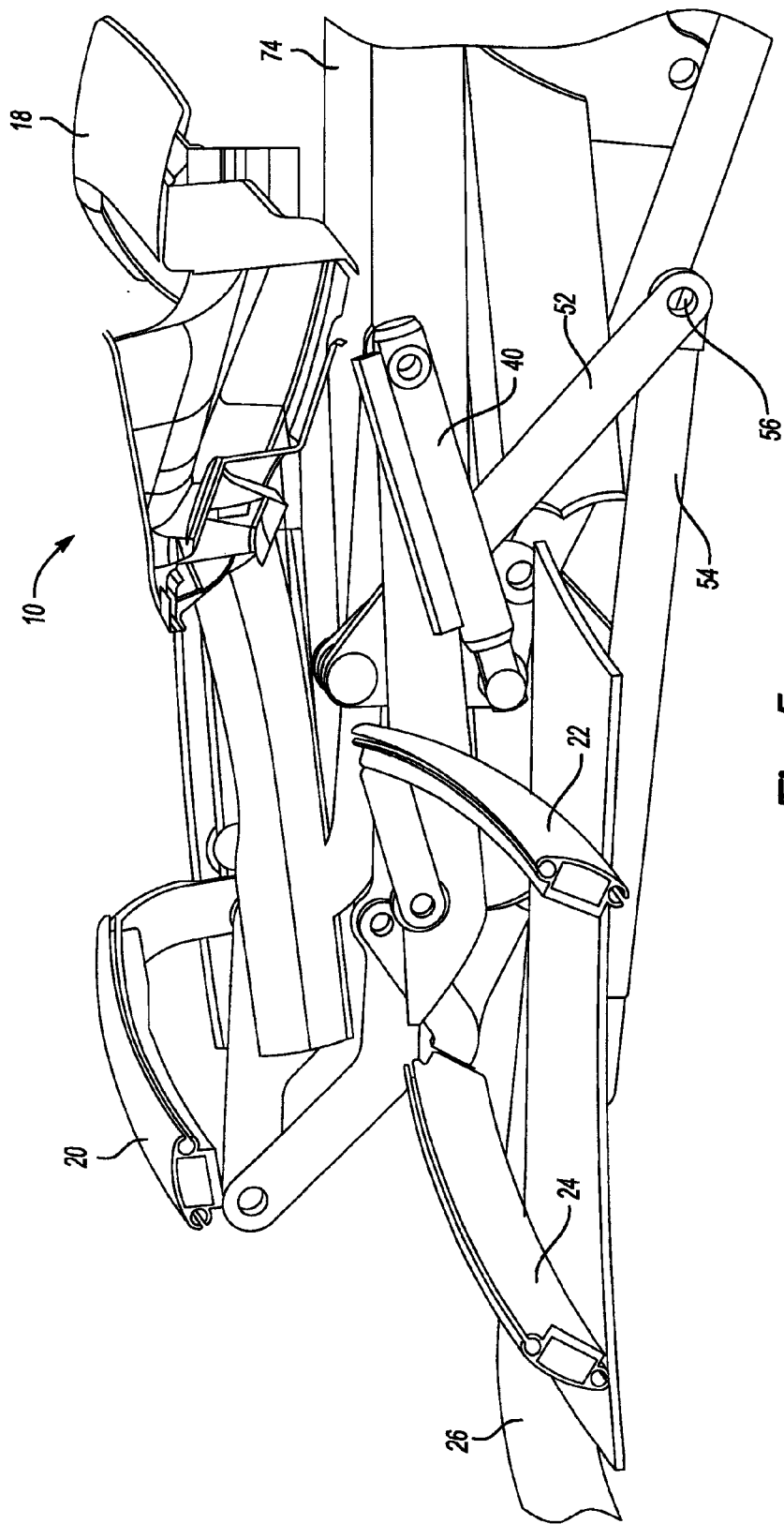
FIG. 5 is a fragmentary perspective view of one side of the convertible top in its fully retracted position.

Referring to FIG. 5, the convertible top 10 is shown in its retracted position with the one bow 18 and two bow 20 folded over the center rail 74. Center rail 74 is pivotally connected to the three bow 22 and four bow 24. The cylinder 40 is also pivotally connected to the center rail 74. The upper pressure link 52 and lower pressure link 54 are pivoted to an acute angle with the lower pressure link 54 extending rearwardly from the upper pressure link 52 to the rear bow 26. When stored, the convertible top 10 is compactly folded in a Z-fold arrangement with the front of the top being folded over an intermediate section which is folded over the lower section of the roof including the rear bow 26.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

I claim:

1. A convertible top for a vehicle having a windshield header and a rear deck, the top comprising:
   a flexible cover;
   a top stack linkage that supports the cover,
   a front bow, attached to the top stack linkage, selectively securable to the windshield header and releasable from the header to retract the top;
   a rear bow that engages the rear deck when the top is in an extended position;
   wherein the top stack linkage has a right side and a left side, and wherein each side includes:
      a four bar link that is adapted to lift the front bow off of the windshield header;
      a pressure link that selectively applies pressure to the rear bow;
      a power cylinder secured to the top stack linkage that is connected to the four bar link and the pressure link, wherein when the power cylinder is actuated in a first direction the four bar linkage lifts the front bow off of the windshield header and the pressure link releases the pressure applied to the rear bow, and wherein when the power cylinder is actuated in the second direction the four bar linkage lowers the front bow onto the windshield header and the pressure link applies pressure to the rear bow; and
   wherein the power cylinder is connected through a drag link to a hook shaped end of one of the links of the four bar link and wherein the power cylinder is connected to a pivot arm formed on an upper link of the pressure link.

2. The convertible top of claim 1 wherein the pressure link includes an upper link and a lower link that are aligned when the pressure link applies pressure to the rear bow.

3. The convertible top of claim 1 wherein the upper link extends in a longitudinal direction and the pivot arm is joined to the upper link at an angle relative to the upper link, wherein the upper link is pivotally connected to the top stack linkage where the pivot arm is joined to the upper link, wherein the cylinder is connected to the pivot arm to act upon the pivot arm to rotate the upper link to release the pressure in the first direction and apply the pressure in the second direction.

4. The convertible top of claim 3 wherein the drag link is connected on a first end between the cylinder where the cylinder is connected to the pivot arm and on a second end to the four bar link.

5. The convertible top of claim 4 wherein the four bar link includes a rear link that has a hook shaped end, and wherein the hook shaped end is connected to the second end of the drag link.

6. A convertible top for a vehicle having a windshield header and a rear deck, the top comprising:
- a flexible cover;
- a top stack linkage that supports the cover,
- a front bow, attached to the top stack linkage selectively securable to the windshield header and releasable from the header to retract the top;
- a rear bow that engages the rear deck when the top is in an extended position;
- wherein the top stack linkage has a right side and a left side, and wherein each side includes:
  - a four bar link that is adapted to lift the front bow off of the windshield header;
  - a pressure link that selectively applies pressure to the rear bow;
  - a power cylinder secured to the top stack linkage that is connected to the four bar link and the pressure link, wherein when the power cylinder is actuated in a first direction the four bar linkage lifts the front bow off of the windshield header and the pressure link releases the pressure applied to the rear bow, and wherein when the power cylinder is actuated in the second direction the four bar linkage lowers the front bow onto the windshield header and the pressure link applies pressure to the rear bow;
- wherein the pressure link includes an upper link and a lower link that are aligned when the pressure link applies pressure to the rear bow;
- wherein the upper link extends in a longitudinal direction and a pivot arm is joined to the upper link that extends at an angle relative to the upper link, wherein the upper link is pivotally connected to the top stack linkage where the pivot arm is joined to the upper link, wherein the cylinder is connected to the pivot arm to act upon the pivot arm to rotate the upper link to release the pressure in the first direction and apply the pressure in the second direction; and
- wherein a drag link is connected on a first end between the cylinder where the cylinder is connected to the pivot arm and on a second end to the four bar link.

7. The convertible top of claim 6 wherein the four bar link includes a rear link that has a hook shaped end, and wherein the hook shaped end is connected to the second end of the drag link.

\* \* \* \* \*

UNITED STATES PATENT AND TRADEMARK OFFICE
CERTIFICATE OF CORRECTION

PATENT NO. : 8,308,219 B2
APPLICATION NO. : 12/693528
DATED : November 13, 2012
INVENTOR(S) : Michael T. Willard et al.

It is certified that error appears in the above-identified patent and that said Letters Patent is hereby corrected as shown below:

Column 5, Line 1, Claim 3:

After "The convertible top of claim" Delete "1" and insert -- 2 --.

Signed and Sealed this
Second Day of April, 2013

Teresa Stanek Rea
*Acting Director of the United States Patent and Trademark Office*